US008949026B2

(12) United States Patent
Sugawara

(10) Patent No.: US 8,949,026 B2

(45) Date of Patent: Feb. 3, 2015

(54) NAVIGATION SERVER, NAVIGATION APPARATUS, AND NAVIGATION SYSTEM

(75) Inventor: Aiko Sugawara, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 700 days.

(21) Appl. No.: 12/668,214

(22) PCT Filed: Jul. 3, 2008

(86) PCT No.: PCT/JP2008/001766

§ 371 (c)(1), (2), (4) Date: Jan. 8, 2010

(87) PCT Pub. No.: WO2009/008138

PCT Pub. Date: Jan. 15, 2009

(65) Prior Publication Data

US 2010/0191455 A1 Jul. 29, 2010

(30) Foreign Application Priority Data

Jul. 11, 2007 (JP) ................................ 2007-182493

(51) Int. Cl.

| | |
|---|---|
| ***G01C 21/34*** | (2006.01) |
| ***G08G 1/0968*** | (2006.01) |
| G09B 29/00 | (2006.01) |
| ***G09B 29/10*** | (2006.01) |

(52) U.S. Cl.

CPC ...... *G01C 21/3492* (2013.01); *G08G 1/096827* (2013.01); *G08G 1/096844* (2013.01); *G08G 1/096861* (2013.01); *G09B 29/007* (2013.01); *G09B 29/106* (2013.01)

USPC ............................ 701/533; 701/527; 701/482

(58) Field of Classification Search

CPC .... G01C 1/005; G01C 1/3415; G01C 1/3461; G01C 1/3492; G01C 1/3658; G08G 1/0112; G08G 1/012; G08G 1/091

USPC .................................. 701/201, 209–211, 527

See application file for complete search history.

(56) References Cited

U.S. PATENT DOCUMENTS

| | | | | |
|---|---|---|---|---|
| 2006/0184321 | A1* | 8/2006 | Kawakami et al. ........... | 701/209 |
| 2007/0106470 | A1* | 5/2007 | Nakayama et al. ........... | 701/211 |
| 2007/0150185 | A1* | 6/2007 | Nagase et al. ................ | 701/209 |

FOREIGN PATENT DOCUMENTS

| | | |
|---|---|---|
| JP | 2005-283480 | 10/2005 |
| JP | 2006-47246 | 2/2006 |
| JP | 2007-248183 | 9/2007 |

OTHER PUBLICATIONS

International Search Report for Application No. PCT/JP2008/001766, dated Aug. 5, 2008.

*Primary Examiner* — Jerrah Edwards

(74) *Attorney, Agent, or Firm* — Nelson Mullins Riley & Scarborough LLP; Anthony A. Laurentano

(57) ABSTRACT

A navigation server (100) evaluates a transition cost $\delta_k$ from a reference line to each $k^{th}$ (k=1~n) link via one node on the basis of a deviation of a first movement cost $c_{1k}$ per unit length of the $k^{th}$ link from the minimum value of the first movement cost $c_{1k}$ per unit length of all $k^{th}$ links. Furthermore, a second movement cost $c_{2k}$ corresponding to a net movement cost in each link can be evaluated on the basis of the first movement cost $c_{1k}$ in each link and the transition cost from the reference link to each link. When an evaluation result or a road traffic information based on the evaluation result is provided, a navigation apparatus can be make to guide a vehicle (2) according to a proper navigation route in view of real road traffic conditions.

6 Claims, 5 Drawing Sheets

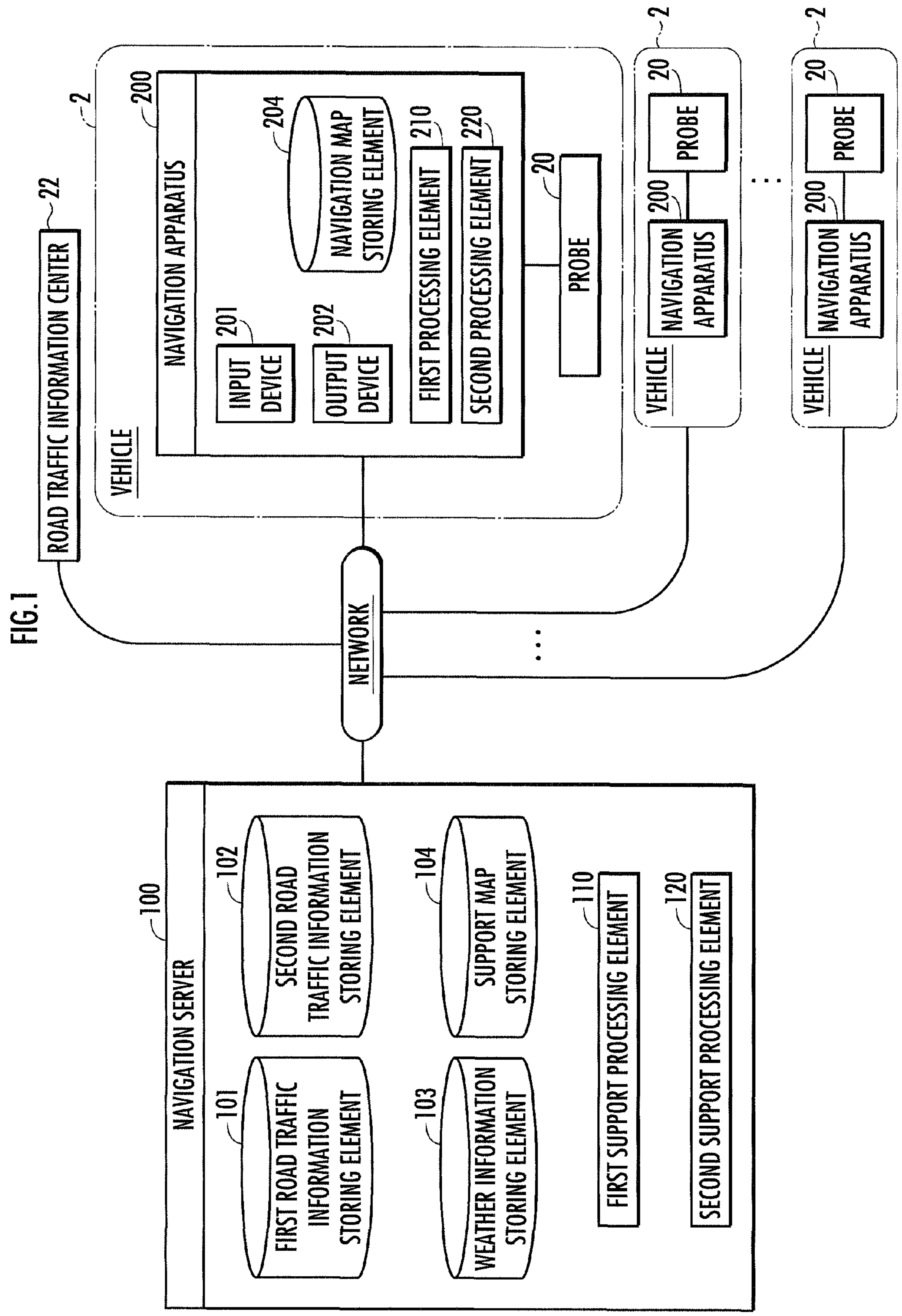
FIG.1
ROAD TRAFFIC INFORMATION CENTER
22
2
VEHICLE
NAVIGATION APPARATUS
200
INPUT DEVICE
201
OUTPUT DEVICE
202
NAVIGATION MAP STORING ELEMENT
204
FIRST PROCESSING ELEMENT
210
SECOND PROCESSING ELEMENT
220
PROBE
20
VEHICLE
NAVIGATION APPARATUS
200
PROBE
20
2
VEHICLE
NAVIGATION APPARATUS
200
PROBE
20
2
NETWORK
NAVIGATION SERVER
100
FIRST ROAD TRAFFIC INFORMATION STORING ELEMENT
101
SECOND ROAD TRAFFIC INFORMATION STORING ELEMENT
102
WEATHER INFORMATION STORING ELEMENT
103
SUPPORT MAP STORING ELEMENT
104
FIRST SUPPORT PROCESSING ELEMENT
110
SECOND SUPPORT PROCESSING ELEMENT
120

FIG.2
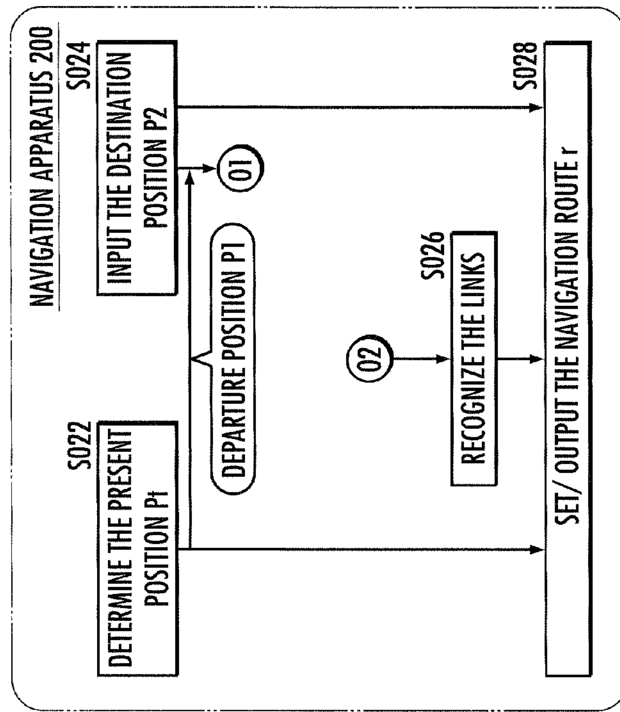
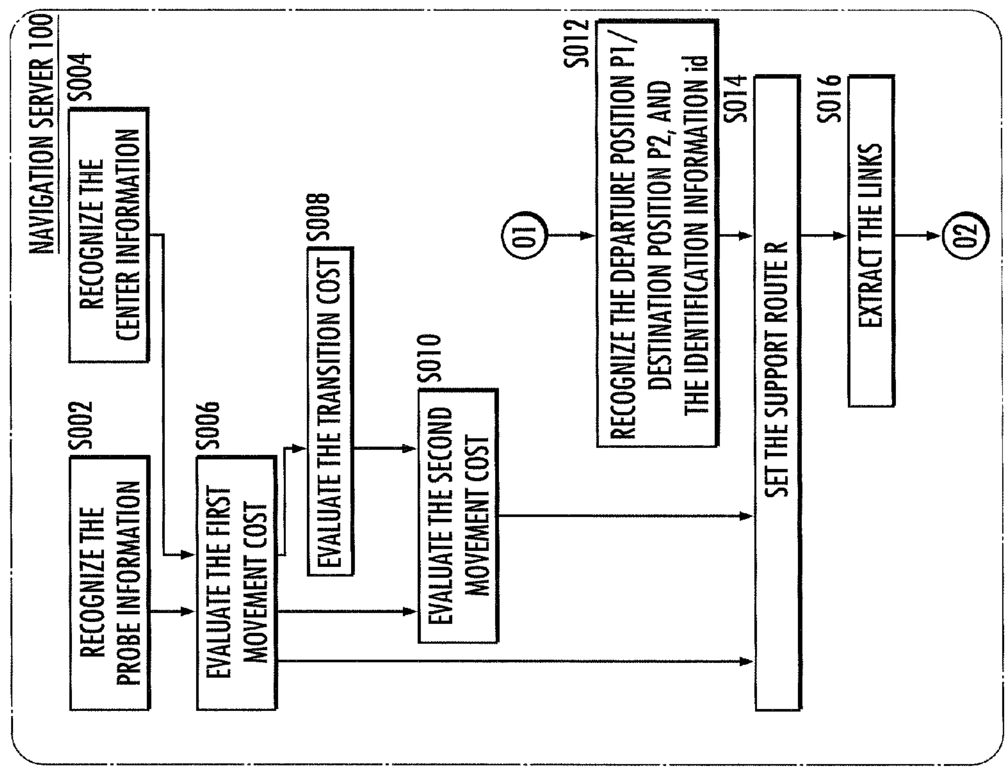

S2
P2
R3 (R)
R2
R1
P1
S1

NAVIGATION SERVER, NAVIGATION APPARATUS, AND NAVIGATION SYSTEM

PRIORITY CLAIM

The present application is based on and claims the priority benefit of Japanese Patent Application 2007-182493 filed on Jul. 11, 2007, the contents of which are incorporated herein by reference in its entirety.

BACKGROUND OF THE INVENTION

1. Field of the Invention

The present invention relates to a navigation server and the like which supports a guidance of a mobile object guided by a navigation apparatus on the basis of communication with the navigation apparatus.

2. Description of the Related Art

There has been used proposed a system which analyses data (FCD) about positional information and the like collected by a floating car (or a probe car) and uses the analysis result thereof to support smooth driving of plural vehicles. Moreover, there has been proposed a method of providing traffic information per divergent direction at a node such as an intersection to a navigation apparatus (refer to Japanese Patent Laid-open No. 2005-283480).

At a node with at least three links intersected, when a user transits from one link to another link, the movement cost varies in accordance with traffic conditions around the node. For example, when an antecedent vehicle $Q_1$ and a subsequent vehicle $Q_2$ are facing a heavy traffic on the oncoming lane at a node where a first link and a prior link are intersected as illustrated in FIG. 5(*a*), it is hard for the antecedent vehicle $Q_1$ to turn right and it is hard for the subsequent vehicle $Q_2$ to advance smoothly due to the antecedent vehicle $Q_1$. In this situation, transition costs from the prior link to the first and second links, respectively, become higher. On the other hand, as illustrated in FIG. 5(*b*), when the antecedent vehicle $Q_1$ and the subsequent vehicle $Q_2$ are facing a light traffic on the oncoming lane at the same node, the vehicle $Q_1$ can make a right turn immediately, and the vehicle $Q_2$ is not obstructed by a vehicle in the front, thus, it can advance smoothly. In this situation, the transition costs from the prior link to the first and the second links, respectively, are lower. Moreover, when there are two lanes in the prior link for diverging vehicles to the first and second links, respectively, even though the vehicle $Q_1$ is hard to make a right turn as mentioned above, the vehicle $Q_2$ can transit to the second link regardless of the vehicle $Q_1$, the transition cost from the prior link to the first link is high, however, the transition cost from the prior link to the second link is low.

Thereby, when the transition cost from one link to each of the other links is not accurately evaluated, the overall evaluation on the movement cost for the user to move from plural links may deviate from the real traffic conditions, and further the guiding behavior of the user may become inappropriate from the viewpoint of movement cost.

SUMMARY OF THE INVENTION

The present invention has been accomplished in view of the aforementioned problems, and it is therefore an object of the present invention to provide a navigation server and the like capable of accurately evaluating a transition cost from one link to each of the other links and supporting a guidance of a mobile object guided by a navigation apparatus on the basis of the evaluation result.

A first aspect of the present invention provides a navigation server configured to support a guidance of a user performed by a navigation apparatus on the basis of communication with the navigation apparatus. The navigation server comprises: a first support processing element configured to recognize a probe information representing a movement history of a first mobile object determined by a probe included in the first mobile object on the basis of communication with the probe, recognize a center information on the basis of communication with a road traffic information center, and evaluate a first movement cost for each moving direction of each link on the basis of either one or both of the probe information and the center information; and a second support processing element configured to make the navigation apparatus recognize, on the basis of communication with the navigation apparatus included in a second mobile object, an evaluation result generated by the first support processing element or a road traffic information generated by the first support processing element on the basis of the evaluation result, wherein the first support processing element further evaluates a transition cost from one reference link to each $k^{th}$ (k=1~n) link via one node on the basis of a first deviation and evaluates a second movement cost on the basis of the first movement cost and the transition cost for the $k^{th}$ link, and the first deviation is a deviation of the first movement cost per unit length for each $k^{th}$ link in a direction away from the node from the minimum value of the first movement costs per unit length for all the $k^{th}$ links.

According to the navigation server of the first aspect of the present invention, the first movement cost for each moving direction of each link represents a predicted or estimated time required by a mobile object to move from one node (end point) to another node of the link. However, in addition to a net movement cost, the first movement cost may contain therein a retention period at the node that cannot be ignored.

Thereby, the transition cost from the reference link to each of the $k^{th}$ (k=1~n) links via one node is evaluated on the basis of the deviation of the first movement cost per unit length for each of the $k^{th}$ links from the minimum value of the first movement costs per unit length for all the $k^{th}$ links. It is understood that an $i^{th}$ link where the first movement cost per unit length is the minimum represents that the mobile object not only can move smoothly through the $i^{th}$ link but also can transit smoothly from the reference link to the $i^{th}$ link. According to this understanding, the longer the retention period at the node joining the reference link and the $i^{th}$ link becomes, the greater the deviation will be. Thereby, on the basis of the deviation, the transition cost from the reference link to each j link (j≠i) can be evaluated. Accordingly, on the basis of the first movement cost for each link and the transition cost from the reference link to each link, the second movement cost equivalent to the net movement cost for each link can be evaluated.

Therefore, by providing the evaluation result or the road traffic information based on the evaluation result to the navigation apparatus, the mobile object can be guided by the navigation apparatus to move along a proper navigation route in view of real road traffic conditions. For example, although the apparent movement cost (first movement cost) is highly evaluated due to the high transition cost, the mobile object can be guided to move by priority along a link where the net movement cost (second movement cost) is low.

A second aspect of the navigation server is dependent on the first aspect of the present invention, wherein the first support processing element further evaluates the transition cost on the basis of a second deviation in place of the first deviation when evaluating individually the first movement cost for the reference link in accordance with each $k^{th}$ link served as a transition destination from the reference link, and the second deviation is a deviation of the first movement cost per unit length for a $k^{th}$ combination path of the reference link and the $k^{th}$ link in a transition direction from the reference link to the $k^{th}$ link from the minimum value of the first movement costs per unit length for all the $k^{th}$ combination paths.

According to the navigation server of the second aspect of the present invention, when the first movement cost for the reference link is evaluated individually in accordance with the $k^{th}$ link served as the transition destination, the transition cost from the reference link to each $k^{th}$ link is evaluated on the basis of the deviation of the first movement cost per unit length for the $k^{th}$ combination path of the reference link and the $k^{th}$ link from the minimum value of the first movement costs per unit length for all the $k^{th}$ combination paths. It is understood that an $i^{th}$ combination path where the first movement cost per unit length is the minimum represents that the mobile object not only can move smoothly through the reference link and the $k^{th}$ link but also can transit smoothly from the reference link to the $k^{th}$ link. According to this understanding, the longer the retention period at the node joining the reference link and the $k^{th}$ link becomes, the greater the deviation will be. Thereby, on the basis of the deviation, the transition cost from the reference link to each $j^{th}$ link ($j \neq i$) can be evaluated. Accordingly, on the basis of the first movement cost for each link and the transition cost from the reference link to each link, the second movement cost equivalent to the net movement cost for each link can be evaluated. Therefore, by providing the evaluation result or the road traffic information based on the evaluation result to the navigation apparatus, the mobile object can be guided by the navigation apparatus to move along a proper navigation route in view of real road traffic conditions.

A third aspect of the navigation server is dependent on the first aspect of the present invention, wherein the first support processing element evaluates the first movement cost for a first-class link on the basis of the probe information and evaluates the first movement cost for a second-class link on the basis of the center information.

According to the navigation server of the third aspect of the present invention, the first movement cost for the first-class link can be evaluated on the basis of the probe information. The first movement cost for the second-class link different from the first-class link can be evaluated on the basis of the center information obtained from the road traffic information center. Therefore, the transition cost and the second movement cost for not only the first-class link but also the second-class link can be evaluated.

A fourth aspect of the navigation server which is dependent on the first aspect of the present invention further includes a support map storing element configured to store a support map information, wherein the second support processing element recognizes a departure position and a destination position of the second mobile object on the basis of communication with the navigation apparatus, sets a route which joins the departure position and the destination position and has the minimum sum of the movement costs on the basis of the support map information stored in the support map storing element and the evaluation result generated by the first support processing element, and makes the navigation apparatus recognize an identification information for identifying a link constituting a part of the route as the road traffic information.

According to the navigation server of the fourth aspect of the present invention, by making the navigation apparatus recognize a part of a preferable support route in view of the net movement cost, it is possible for the navigation apparatus to guide the mobile object in a preferred mode in view of the real road traffic conditions.

The navigation apparatus of a fifth aspect of the present invention is configured to guide a mobile object on the basis of communication with a navigation server and comprises: a navigation map storing element configured to store a navigation map information, a first processing element configured to recognize, on the basis of communication with the navigation server, a first movement cost for each link and a transition cost from a reference link to a $k^{th}$ link (k=1−n) via one node which are evaluated by the navigation server, or a road traffic information based on the evaluation result evaluated by the navigation server, and a second processing element configured to set a navigation route on the basis of the evaluation result or the road traffic information recognized by the first processing element and the navigation map information stored in the navigation map storing element, and output the navigation route.

According to the navigation apparatus of the fifth aspect of the present invention, by taking into consideration the transition cost from the reference link to each link, the mobile object can be guided to move along a proper navigation route in view of the second movement cost for each link (net movement cost).

A navigation system of a sixth aspect of the present invention is composed of the navigation server of the first aspect and the navigation apparatus of the fifth aspect of the present invention.

According to the navigation system of the sixth aspect of the present invention, although the apparent movement cost (first movement cost) is highly evaluated due to the high transition cost, the mobile object can be guided to move along a proper navigation route in view of real road traffic conditions, such as to move by priority along a link where the net movement cost (second movement cost) evaluated by the navigation server is low.

BRIEF DESCRIPTION OF THE DRAWINGS

FIG. 1 is an explanatory diagram illustrating a structure of a navigation system of the present invention.

FIG. 2 is an explanatory diagram illustrating functions of the navigation system of the present invention.

DETAILED DESCRIPTION OF THE PREFERRED EMBODIMENTS

Figure 3:
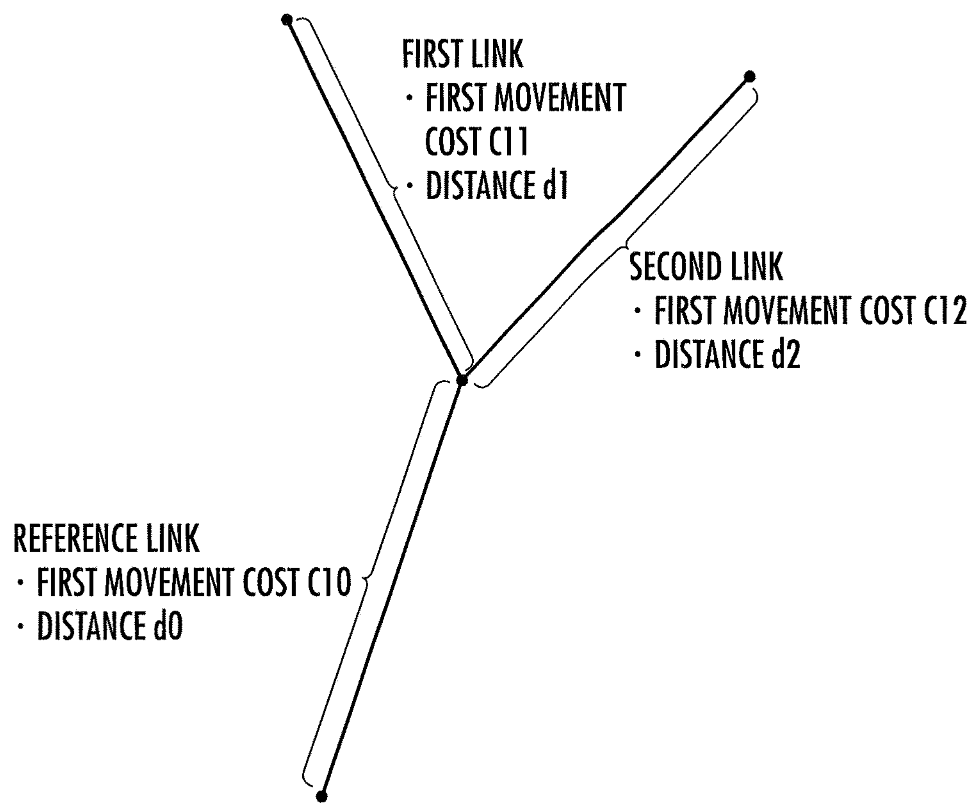
FIG. 3 is an explanatory diagram illustrating a relation between one reference link and plural links.

An embodiment of a navigation system of the present invention will be described with reference to the drawings.

The description will be carried on a structure of the navigation system of the present invention. The navigation system illustrated in FIG. 1 is composed of a navigation server 100 and a navigation apparatus 200 mounted in a vehicle 2. It is acceptable to mount the navigation apparatus 200 in a mobile device in addition to a vehicle. It is also acceptable for it to be ported by a user. The vehicle 2 is mounted with a probe 20. The probe 20 determines a position of the vehicle and transmits the determined position to the navigation server 100 in a predefined interval. Since the vehicle 2 is mounted with both of the probe 20 and the navigation apparatus 200, the vehicle 2 corresponds to both a first mobile object and a second mobile object.

The navigation server 100 is comprised of one or a plurality of server computers. The navigation server 100 is provided with a first road traffic information storing element 101, a second road traffic information storing element 102, a weather information storing element 103, a support map storing element 104, a first support processing element 110, and a second support processing element 120.

The first road traffic information storing element 101 is stored with first road traffic information (required moving time, traffic congestion information or the like for an individual link) which is based on probe information (position of an individual probe car at an individual timing) transmitted or uploaded from the navigation apparatus 200 to the navigation server 100. The second road traffic information storing element 102 is stored with a center information (traffic regulation information, event information of an event around an individual link, type information of the event if there were an event and the like, in addition to the required moving time and the traffic congestion information for the individual link) transmitted from a road traffic information center server or the like to the navigation server 100. The weather information storing element 103 is stored with weather information concerning an individual link which is transmitted from a weather information center server to the navigation server 100. The support map storing element 104 is stored with support map information. In the support map information, the position, shape and posture or the like of an individual link constituting a road are expressed by a series of coordinates ((latitude, longitude), or (latitude, longitude, altitude)). Moreover, an individual link is tagged with link identification information for identifying the individual link and road type data.

The first support processing element 110, on the basis of direct or indirect communication with the probe 20 mounted in the vehicle (first mobile object) 2, recognizes the probe information of the vehicle 2 for each first-class link determined by the probe 20. Moreover, the first support processing element 110 recognizes a movement cost or the like for each second-class link, which is transmitted from the road traffic information center 22, as the center information. The second-class link is defined as a link different from the first-class link. The first support processing element 110 evaluates a first movement cost $c_1$ for the first-class link on the basis of the probe information and evaluates the first movement cost $c_1$ for the first-class link on the basis of the center information. The first support processing element 110 further evaluates a transition cost $\delta_i$ from one reference link to each $k^{th}$ (k=1~n) link via one node. On the basis of the first movement cost $c_{1i}$ and the transition cost $\delta_i$ for an $i^{th}$ link, the first support processing element 110 evaluates a second movement cost $c_2$. The second support processing element 120 informs, on the basis of communication with the navigation apparatus 200 mounted in the vehicle (second mobile object) 2, the navigation apparatus 200 of the evaluation result. The second support processing element 120, on the basis of communication with the navigation apparatus 200, recognizes a departure position (or a present position) $p_1$ and a destination position $p_2$ of the vehicle 2 mounted with the navigation apparatus 200. The second support processing element 120, on the basis of the support map information stored in the support map storing element 104, the first movement cost $c_1$ or the second movement cost $c_2$ for each link recognized by the first support processing element 110 and the like, sets a support route R joining the departure position $p_1$ and the destination position $p_2$. Thereafter, the second support processing element 120, on the basis of communication with the navigation apparatus 200, informs the navigation 200 with respect to a constitution link constituting a part of the support route R.

The navigation apparatus 200 is comprised of an ECU or a computer (constituted from a CPU, a ROM, a RAM, an I/O and the like) mounted in the vehicle 2 as hardware, and a navigation program as software stored in a memory, which provides the computer with various functions. It should be noted that the navigation program may be pre-installed in the memory (ROM) in the vehicular computer, or the entire or a part of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation apparatus 200 is provided with an input device 201, an output device 202, a navigation map storing element 204, a first processing element 210 and a second processing element 220.

The input device 201 is comprised of operating buttons or a microphone disposed in a center console or the like of the vehicle 2. It is possible for a user to perform various settings by operating or vocally instructing the input device 201. The output device 202 is a display element disposed in the center console of the vehicle 2 for displaying or outputting navigation map information or the like. The navigation map storing element 204 is stored with the navigation map information or the like to be output to the output device 202. In the navigation map information, the location, shape and posture or the like of an individual link constituting a road are expressed by a series of coordinates. Moreover, an individual link is tagged with the link identification information for identifying the individual link. Although the definitions of the coordinates in the navigation map information and the support map information are different due to the different specifications and data architectures therebetween, it is possible to match the links by tagging the identical links with common link identification information.

The first processing element 210, on the basis of communication with the navigation server 100, informs the navigation server 100 with respect to the departure position $p_1$ of the vehicle 2 and the destination position $p_2$ input by a user through the input device 201. The second processing element 220, on the basis of communication with the navigation server 100, recognizes the constitution link constituting a part of the support route R joining the departure position $p_1$ and the destination position $p_2$ which is set by the navigation server 100 as the road traffic information. The second processing element 220, on the basis of the road traffic information recognized by the first processing element 210 and the navigation map information stored in the navigation map storing element 204, sets a navigation route r and outputs the navigation route r to the output device 202.

It should be noted that "a component of the navigation server 100 or the navigation apparatus 200 which serves as hardware "recognizes" information" means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

The function of the navigation system with the above-mentioned configuration will be explained hereinafter.

The first support processing element 110 in the navigation server 100, on the basis of communication with the probe 20 disposed in each of a plurality of vehicles (first mobile object) 2, recognizes a movement history of the vehicle 2 for each of a plurality of the first-class links determined by the probe 20 as the probe information (FIG. 2/S002). The probe information is specified by, for example, a coordinate of the vehicle 2 every predefined duration, and if necessary the link identification information of a link containing therein the coordinate.

Moreover, the first support processing element 110, on the basis of communication with the road traffic information center 22, recognizes movement state of the vehicle 2 for the second-class link as the center information (FIG. 2/S004). The center information is specified by, for example, the movement cost of the vehicle 2 for each moving direction of each link of a primary road in different hours of a day.

Thereafter, the first support processing element 110, on the basis of the probe information and the center information, evaluates the first movement cost $c_1$ for each moving direction of the first-class link and the first movement cost $c_1$ for each moving direction of the second-class link, respectively (FIG. 2/S006). The first movement link $c_1$ for each link is evaluated according to a statistic approach, such as calculating the average value of a plurality of probe information for one link with weight added in accordance with a time length elapsed from a measured timing.

The first support processing element 110 evaluates the transition cost $\delta_i$ from one reference link to each $k^{th}$ (k=1~n) link via one node (FIG. 2/S008). As illustrated in FIG. 3, the evaluation method on the transition cost $\delta_k$ (k=1, 2) of a node possible for the position to be transited from the reference link to the first link or the second link may be considered as an example. Note that the links possible for transition from the reference link via one node may be three or more.

When there is a single lane in the reference link toward the first link or the second link, the first movement cost $c_{10}$ for the reference link along the corresponding direction has a single value. In this situation, the transition cost $\delta_i$ per unit length from the reference link to the $i^{th}$ link where the first movement cost $c_{1k}/d_k$ is the minimum is evaluated according to the equation (1) on the basis of the first movement cost $c_{1i}$ for the $i^{th}$ link and the length $d_i$ of the $i^{th}$ link.

$$\delta_i=\gamma(d_i)c_{1i} \quad (1)$$

In the equation (1), $\gamma(d_i)$ is a coefficient of a reduction function of $d_i$. Accordingly, the longer the $i^{th}$ link becomes (the greater the $d_i$ becomes), the lower the transition cost $\delta_i$ from the reference link will be evaluated. This is based on the understanding or knowledge that the percentage of the transition cost $\delta_i$ in the first movement cost (apparent movement cost) $c_{1i}$ decreases as the length of the $i^{th}$ link increases.

While the transition cost $\delta_j$ from the reference link to the $j^{th}$ ($j\neq i$) link is evaluated according to the equation (2) on the basis of the first movement cost $c_{1i}$ for the $i^{th}$ link, the first movement cost $c_{1j}$ for the $j^{th}$ link, the length $d_i$ of the $i^{th}$ link and the length $d_j$ of the $j^{th}$ link.

$$\delta_i=\{\gamma(d_i)-\alpha(d_j/d_i)\}c_{1i}+\alpha c_{1j} \quad (2)$$

In the equation (2), $\alpha$ ($0<\alpha<1$) is a coefficient representing a ratio of the deviation $\delta_j-\delta_i$ between the transition cost $\delta_j$ from the reference link to the $j^{th}$ link and the transition cost $\delta_i$ from the reference link to the $i^{th}$ link with relation to the deviation (the first deviation) between the first movement cost $c_{1j}$ for the $j^{th}$ link and the minimum first movement cost (the first movement cost for the $i^{th}$ link) $c_{1i}$.

When the lane in the reference link toward the first link is separate from that toward the second link, the first movement cost $c_{10}$ for the reference link along the corresponding direction is evaluated according to each link served as the transition destination or according to each lane.

In this situation, the transition cost $\delta_i$ from the reference link to the $i^{th}$ link in the $i^{th}$ combination path of the reference link and the $i^{th}$ link, where the first movement cost per unit length ($c_{10k}+c_{1k}$) ($d_0+d_k$) is the minimum, is evaluated according to the equation (1) on the basis of the first movement cost $c_{1i}$ and the length $d_i$ of the $i^{th}$ link.

The transition cost $\delta_j$ from the reference link to the $j^{th}$ link ($j\neq i$) is evaluated according to the equation (3) on the basis of the first movement cost $c_{10i}$ and $c_{10j}$ transited from the reference link to each of the destination links, the length $d_0$ of the reference link, the first movement cost $c_{1i}$ for the $i^{th}$ link and the first movement cost $c_{1j}$ for the $j^{th}$ link, and the length $d_i$ of the $i^{th}$ link and the length $d_j$ of the $j^{th}$ link.

$$\delta_j=\gamma(d_i)c_{1i}-\beta((d_0+d_j)/(d_0+d_i))(c_{10i}+c_{1i})+\beta(c_{10j}+c_{1i}) \quad (3)$$

In the equation (3), $\beta$ ($0<\beta<1$) is a coefficient representing a ratio of the deviation $\delta_j-\delta_i$ between the transition cost $\delta_j$ from the reference link to the $j^{th}$ link and the transition cost $\delta_i$ from the reference link to the $i^{th}$ link with relation to the deviation (the second deviation) between the first movement cost $c_{10j}+c_{1j}$ for the $j^{th}$ combination path and the minimum first movement cost (the first movement cost for the $i^{th}$ combination path) $c_{10i}+c_{1i}$.

Subsequently, the first support processing element 110, on the basis of the first movement cost $c_{1k}$ and the transition cost $\delta_k$ for the $k^{th}$ link, evaluates the second movement cost $c_{2k}$ (FIG. 2/S010). For example, the second movement cost $c_{2k}$ is evaluated on the basis of the first movement cost $c_{1k}$ and the transition cost $\delta_k$ according to the equation (4).

$$c_{2k}=c_{1k}-\delta_k \quad (4)$$

In the navigation apparatus 200 of the vehicle (the second mobile object) 2, the first processing element 210 determines the present position $p_t$ of the vehicle 2 on the basis of GPS signals received by a communication device or outputs from an acceleration sensor, a rate sensor and the like mounted in the vehicle 2 (FIG. 2/S022). The accumulated determination result of the present position $p_t$ is equivalent to the probe information obtained from the probe 20. Meanwhile, the destination position $p_2$ of the vehicle 2 is input by the user through the input device 20 (FIG. 2/S024). The first processing element 210 transmits the destination position $p_2$ of the vehicle 2, the present position $p_t$ (the departure position $p_1$) of the vehicle 2 at the time where the destination position $p_2$ is input, and the navigation identification information id for identifying the navigation apparatus 200 to the navigation server 100.

Figure 4:
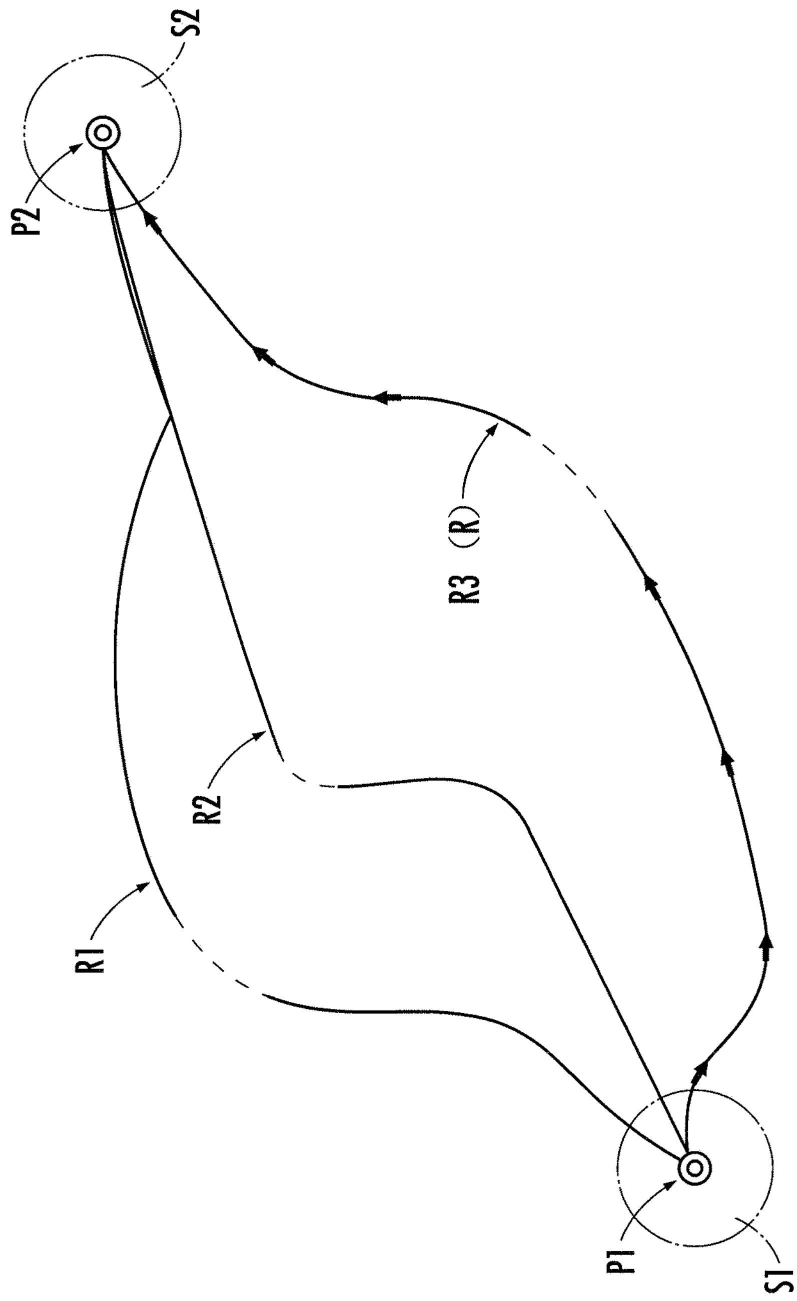
FIG. 4 is an explanatory diagram illustrating a support route set by the navigation server.
Figure 5:
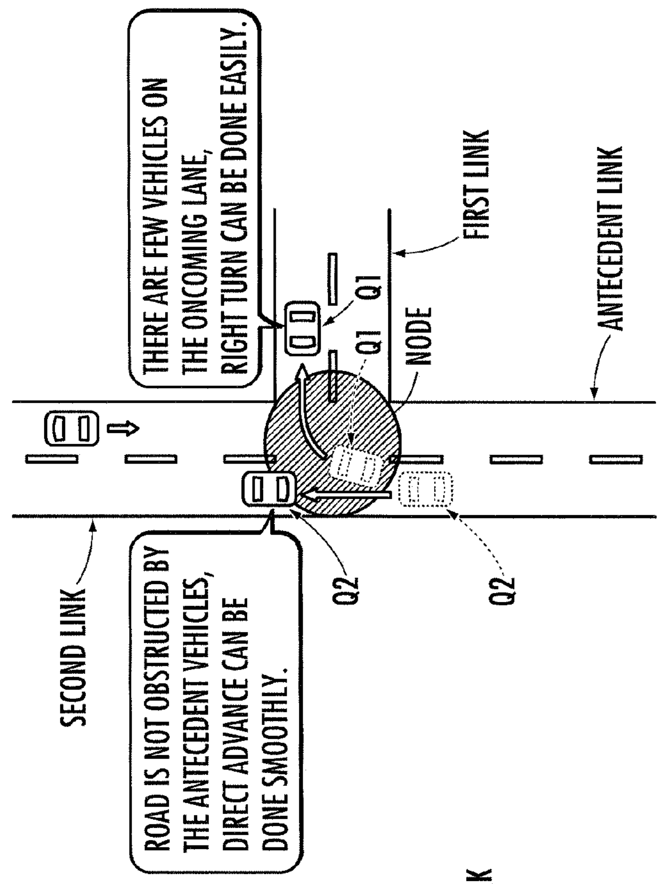
FIG. 5 is an explanatory diagram illustrating a relation between road traffic conditions and a transition link.
Figure 5:
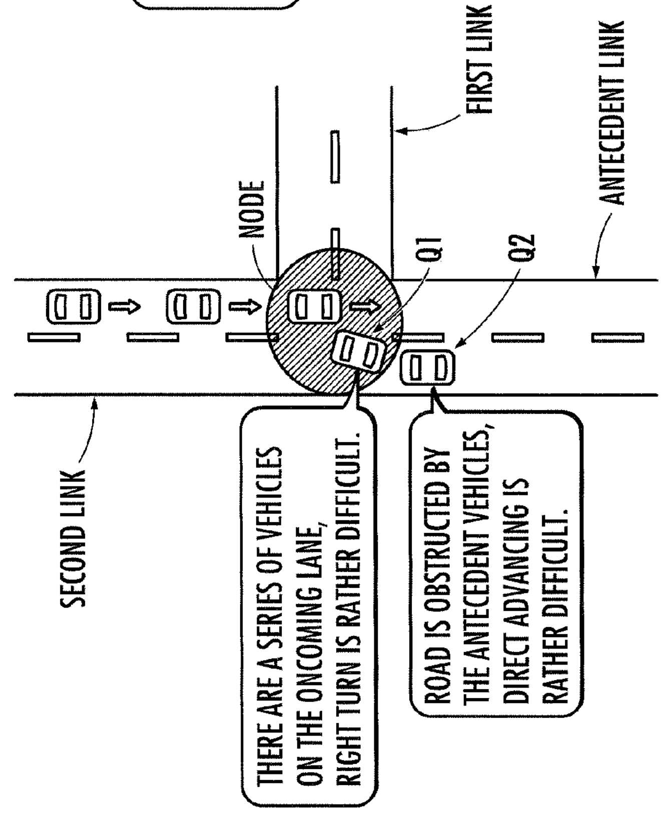

Correspondingly, the second support processing element 120 in the navigation server 100 recognizes the departure position $p_1$ and the destination position $p_2$ of the vehicle 2, and the navigation identification information id of the navigation apparatus 200 (FIG. 2/S012). Thereafter, the second support processing 120 set the support route R joining the departure position $p_1$ and the destination position $p_2$ of the vehicle 2 on the basis of the first movement cost $c_1$ and the second movement cost $c_2$ evaluated by the first support processing element 110, the peripheral weather information of each link stored in the weather information storing element 130, and the support map information stored in the support map storing element 104 (FIG. 2/S014). According thereto, as illustrated in FIG. 4, for example, three support routes $R_1$ to $R_3$ are set and the support route $R_3$ is selected as the final support route from the three support routes $R_1$ to $R_3$. The support route R is set on conditions where the moving distance to the destination position $p_2$ or a predicted duration required for moving thereto is the shortest, or the mileage of the vehicle 2 moving to the destination position $p_2$ is the best, and the like. Note that the support route R may be set according to conditions (the shortest distance, the shortest duration, the best mileage (ecology) and the like) selected by the user which is transmitted or uploaded from the navigation apparatus 200 to the navigation server 100.

Thereafter, the second support processing element 120 extracts the constitution link which constitutes a part of the support route R (FIG. 2/S016). Accordingly, as illustrated in FIG. 4 by black arrows for example, the constitution links which constitute apart of the support route R and have a number equal to or below than a predefined numbers are extracted. A link or links contained in a first area $S_1$ with the departure position $p_1$ as a reference point or in a second area $S_2$ with the destination position $p_2$ as a reference point will be excluded from the extracted links. The second support processing element 120 transmits the link identification information for the extracted link to the navigation apparatus 200 which is identified by the navigation identification information. The link identification information is equivalent to the evaluation result performed by the first support processing element 110 or the road traffic information based on the evaluation result. According thereto, the second processing element 220 in the navigation apparatus 200 recognizes the extracted link (FIG. 2/S026).

It is also acceptable that an information representing a version of the navigation map information is transmitted or uploaded from the navigation apparatus 200 to the navigation server 100, whether or not a link is contained in the navigation map information of the above version is determined accordingly in the navigation server 100, and the link is extracted after the determination result is negative. Furthermore, it is acceptable that the support map information having a version matched with the above version of the navigation map information is selected from the support map information of plural versions stored in the support map storing element 104 in the navigation server 100, and a link is extracted from the selected support map information.

Subsequently, the second processing element 220 set a navigation route r on the basis of the link identification information (road traffic information), the navigation map information stored in the navigation map storing element 204, and the present position $p_t$ and the destination position $p_2$ of the vehicle 2, and outputs the navigation route r via the output device 202 (FIG. 2/S028). Thereby, for example, the navigation route r, which contains the extracted links as illustrated in FIG. 4 and is identical to or similar to the support route R, is displayed on the output device 202.

According to the navigation system exhibiting the above-mentioned functions, the first movement cost $c_1$ for each link evaluated by the navigation server 100 represents a time duration required by the vehicle 2 to move from one node of a link to the other node. However, in addition to a net movement cost, the first movement cost $c_1$ may contain therein a retention period or the like at the node that cannot be ignored.

Therefore, the transition cost $\delta_k$ from the reference link to each $k^{th}$ (k=1−n) link via one node is evaluated on the basis of the deviation (the first deviation) between the first movement cost per unit length $(c_{1k}/d_k)$ for each $k^{th}$ link and the minimum value of the first movement costs per unit length for all the $k^{th}$ links (refer to the equation (2)). Moreover, when the first movement cost $c_{1k}$ for the reference link is evaluated individually for each $k^{th}$ link served as the transition destination, the transition cost from the reference link to each $k^{th}$ link is evaluated on the basis of the deviation (the second deviation) between the first movement cost per unit length $(c_{10k}+c_{1k})/(d_0+d_k)$ for each $k^{th}$ combination path of the reference link and the $k^{th}$ link and the minimum value of the first movement costs per unit length for all the $k^{th}$ combination paths (refer to the equation (3)).

It is understood that the $i^{th}$ link where the first movement cost $(c_{1k}/d_k)$ per unit length is the minimum or the $i^{th}$ link contained in the $i^{th}$ combination path where the movement cost per unit length $\{(c_{10k}+c_{1k})/(d_0+d_k)\}$ is the minimum represents that the vehicle 2 not only can move smoothly through the $i^{th}$ link but also can transit smoothly from the reference link to the $i^{th}$ link. According to this understanding, the longer the retention period at the node joining the reference link and the $i^{th}$ link becomes, the greater the first deviation or the second deviation will be. Thereby, on the basis of the deviation, the transition cost $\delta_k$ from the reference link to each $i^{th}$ link can be evaluated. Accordingly, on the basis of the first movement cost $c_{1k}$ for each link and the transition cost $\delta_k$ from the reference link to each link, the second movement cost $c_{2k}$ equivalent to the net movement cost for each link can be evaluated (refer to the equation (4)).

Therefore, by providing the evaluation result or the road traffic information based on the evaluation result to the navigation apparatus 200, the user can be guided by the navigation apparatus 200 to move along a proper navigation route r in view of real road traffic conditions (refer to FIG. 2/S028). For example, although the apparent movement cost (the first movement cost $c_{1k}$) is highly evaluated due to the high transition cost $\delta_k$, the user can be guided to move along a proper navigation route r in view of real road traffic conditions, such as to move by priority along a link where the net movement cost (the second movement cost $c_{2k}$) is low.

In the above-mentioned embodiment, the constitution links (or the link identification information thereof) of a part of the support route R set by the navigation server 100 is recognized by the navigation apparatus 200 as the road traffic information (refer to FIG. 4). As another embodiment, the support map is fractioned by a plurality of meshes, the first movement cost $c_1$ or the second movement cost $c_2$ for each link which contains a mesh or meshes where the support route R is contained is recognized by the navigation apparatus 200 as the road traffic information and thereafter, the navigation route r is set on the basis of the road traffic information and is output. It is also acceptable that the setting of the support route R is omitted, a part or the entire part of the evaluation result of the first movement cost $c_1$ or the second movement cost $c_2$ for each link is recognized by the navigation apparatus 200, the navigation route r is set and output on the basis of the evaluation result, and the evaluation result itself may be displayed on the output device 202.

In the above embodiment, the transition cost $\delta_k$ has been evaluated according to the equations (1) to (3) (refer to FIG. 2/S008). However, as another embodiment, it is acceptable to evaluate the first deviation or the second deviation itself, or the average of the first deviation or the average of the second deviation, and the like as the transition cost. Moreover, it is acceptable that the coefficient $\gamma$ in the equation (1) is set as zero or a positive constant.

What is claimed is:

1. A navigation server configured to execute a navigation program stored in memory via processing elements of the navigation server, the navigation program causing, when executed, the navigation server to support a guidance of a user performed by a navigation apparatus on the basis of communication with the navigation apparatus, comprising:

a first support processing element configured via execution of the navigation program to:

recognize probe information representing a movement history of a first mobile object determined by a probe included in the first mobile object on the basis of communication with the probe, recognize center information on the basis of communication with a road traffic information center, access a representation in which roads are each represented as links that connect at one or more nodes, wherein each link has a length and a movement cost, the links comprising a reference link connected to a selected node, and evaluate a first movement cost for each link on the basis of either one or both of the probe information and the center information to generate an evaluation result, wherein the evaluating comprises:

identifying the reference link and each other link connected to the selected node, calculating a cost per unit length for each of the other links, determining a minimum cost per unit length from among the calculated costs per unit length, determining, for each of the other links not having the minimum cost per unit length, an amount of deviation of the cost per unit length from the minimum cost per unit length, and evaluating for each of the other links, a transition cost from the reference link to the other links based on the determined amount of deviation for the respective other links; and a second support processing element configured to:

receive, from the first support processing element, evaluation result or road traffic information generated from the evaluation result, and transmit the evaluation result or the road traffic information to the navigation apparatus, wherein the second support processing unit performs the transmitting based at least in part on communication with the navigation apparatus included in a second mobile object.

2. The navigation server according to claim 1, wherein the first support processing element further evaluates the transition cost on the basis of a second deviation in place of the first deviation when evaluating individually the first movement cost for a reference link in accordance with each of the other links not having the minimum cost per unit length, and the second deviation is a deviation of the first movement cost per unit length for a combination path of the reference link and the other links not having the minimum cost per unit length in a transition direction from the reference link to the other links not having the minimum cost per unit length from the minimum value of the first movement costs per unit length for all the combination paths.

3. The navigation server according to claim 1, wherein the first support processing element evaluates the first movement cost for a first-class link on the basis of the probe information and evaluates the first movement cost for a second-class link on the basis of the center information.

4. The navigation server according to claim 1 further includes a support map storing element configured to store a support map information, wherein the second support processing element recognizes a departure position and a destination position of the second mobile object on the basis of communication with the navigation apparatus, sets a route which joins the departure position and the destination position and has the minimum sum of the second movement cost on the basis of the support map information stored in the support map storing element and the evaluation result generated by the first support processing element, and makes the navigation apparatus recognize an identification information for identifying a link constituting a part of the route as the road traffic information.

5. A navigation apparatus configured to guide a user on the basis of communication with a navigation server, comprising:

a navigation map storing element configured to store navigation map information or road traffic information, wherein the navigation map information comprises a representation in which roads are each represented as links that connect at one or more nodes, wherein each link has a length and a movement cost, the links comprising:

a reference link connected to a selected node, and a plurality of other links connected to the selected node, the plurality of other links including a minimum link having a minimum cost per unit length, a first processing element configured to recognize, on the basis of communication with the navigation server, either or both of:

a first movement cost for each other link and a transition cost from the reference link to the plurality of other links, the first movement cost and transition cost being evaluated by the navigation server based on an amount of deviation of the cost per unit length for each of the other links from the minimum cost per unit length, or a road traffic information that is based on the first movement cost and the transition cost evaluated by the navigation server, and a second processing element configured to set a navigation route on the basis of the evaluation result evaluated by the navigation server or the road traffic information recognized by the first processing element and the navigation map information stored in the navigation map storing element, and output the navigation route.

6. A navigation system comprising a navigation server and a navigation apparatus, wherein the navigation server comprises:

a first support processing element configured to:

recognize probe information representing a movement history of a first mobile object determined by a probe included in the first mobile object on the basis of communication with the probe, recognize center information on the basis of communication with a road traffic information center, access a representation in which roads are each represented as links that connect at one or more nodes, wherein each link has a length and a movement cost, the links comprising a reference link connected to a selected node, and evaluate a first movement cost for each link on the basis of either one or both of the probe information and the center information to generate an evaluation result, wherein the evaluating comprises:

identifying the reference link and each other link connected to the selected node, calculating a cost per unit length for each of the other links, determining a minimum cost per unit length from among the calculated costs per unit length, determining, for each of the other links not having the minimum cost per unit length, an amount of deviation of the cost per unit length from the minimum cost per unit length, and evaluating, for each of the other links, a transition cost from the reference link to the other links based on the determined amount of deviation for the respective other links; and a second support processing element configured to:

receive, from the first support processing element, the evaluation result or road traffic information generated from the evaluation result, and transmit the evaluation result or the road traffic information to the navigation apparatus, wherein the second support processing unit performs the transmitting based at least in part on communication with the navigation apparatus included in a second mobile object;

and wherein the navigation apparatus comprises:

a navigation map storing element configured to store a navigation map information or road traffic information, a first processing element configured to recognize, on the basis of communication with the navigation server, a first movement cost for each link and the transition cost from the reference link to each of the other links which are evaluated by the navigation server, or the road traffic information evaluated by the navigation server, and a second processing element configured to set a navigation route on the basis of the evaluation result evaluated by the navigation server or the road traffic information recognized by the first processing element and the navigation map information stored in the navigation map storing element, and output the navigation route.

* * * * *